United States Patent
Karschin et al.

Patent Number: 5,836,648
Date of Patent: Nov. 17, 1998

[54] VEHICLE SEAT WITH MULTIFUNCTION BACKREST

[75] Inventors: Kurt Karschin, Kirchheim/Teck; Rene Heller, Mengen-Rulfingen, both of Germany

[73] Assignee: Recaro GmbH & Co., Kirchheim/Teck, Germany

[21] Appl. No.: 962,063

[22] Filed: Oct. 31, 1997

[30] Foreign Application Priority Data

Oct. 31, 1996 [DE] Germany ............... 196 43 977.9

[51] Int. Cl.⁶ .................................................. B60N 2/42
[52] U.S. Cl. .......................... 297/216.14; 297/216.12; 297/216.13; 297/354.12; 297/408
[58] Field of Search ................ 297/216.12, 216.13, 297/216.14, 353, 354.1, 354.11, 354.12, 374, 408

[56] References Cited

U.S. PATENT DOCUMENTS

| | | | |
|---|---|---|---|
| 3,186,763 | 6/1965 | Ferrara | 297/216.12 X |
| 3,652,128 | 3/1972 | Schwarz | 297/216.12 X |
| 3,761,125 | 9/1973 | Glance | 297/216.12 X |
| 4,640,547 | 2/1987 | Fromme | 297/353 X |
| 4,787,676 | 11/1988 | Neve de Mevergnies | 297/353 |
| 5,290,091 | 3/1994 | Dellanno et al. | 297/216.12 X |
| 5,378,043 | 1/1995 | Viano et al. | 297/216.12 X |

FOREIGN PATENT DOCUMENTS

| | | |
|---|---|---|
| 4120608 | 1/1993 | Germany . |
| 9215255 | 7/1993 | Germany . |

Primary Examiner—Peter R. Brown
Attorney, Agent, or Firm—Roylance,Abrams,Berdo & Goodman, L.L.P.

[57] ABSTRACT

A vehicle seat has a seat part and a backrest adjustable in inclination relative to the seat part. The backrest is configured in two parts, a top backrest part and a bottom backrest part. The top backrest part is arranged pivotally relative to the bottom backrest part, when the holding force of a clamping device is overcome in the case of a crash under the effect of an actuating force coming from the person in the seat. The top backrest part executes an adjustment movement intercepting the person in the seat. The vehicle seat improves the safety and security of the seat occupant upon a frontal crash or rear crash.

11 Claims, 3 Drawing Sheets

5,836,648

VEHICLE SEAT WITH MULTIFUNCTION BACKREST

FIELD OF THE INVENTION

The present invention relates to a vehicle seat with a seat part and a backrest adjustable in its inclination relative to the seat.

BACKGROUND OF THE INVENTION

Vehicle seats with angularly adjustable backrests are known in various embodiments. A modern vehicle seat will not only give a high measure of comfort to the user, but will also heighten safety and security. In case of accident, the seat helps to protect the person in the seat and will especially supplement other security systems, such as a back-holder system in the form of a belt and/or airbags, for holding the rider in the seat during rebound movement after a crash.

During crashes, the known vehicle seats do not offer the desired measure of security to help avoid injuries to the person in the seat.

SUMMARY OF THE INVENTION

An object of the present invention is to provide improved vehicle seats.

Another object of the present invention is to provide a vehicle seat having improved security for the person in the seat from the effects of front end and rear end crashes.

The foregoing objects are basically obtained by a vehicle seat, comprising a seat part and a backrest having a top backrest part and a bottom backrest part which are pivotally connected. An adjustment means varies inclination of the backrest relative to the seat part. A clamping device coupled to the backrest parts provides a clamping force for restraining relative pivoting of said backrest parts during normal vehicle operating conditions and for allowing the top backrest part to pivot relative to the bottom backrest part to intercept a seat occupant in response to an actuating force from the seat occupant overcoming the clamping force and causing pivoting of the top backrest part during crash conditions.

The pivotal movement of the top backrest part relative to the bottom backrest part is initiated when the clamping force of the clamping device is overcome. In a crash, the actuating force comes from the back of the person in the seat. The top backrest part executes an adjustment movement intercepting the person in the seat. The free path along which the top of the body of the person in the seat can move is shortened by the top backrest part movement to a forward intercept position, in combination with the belt and airbag. The damaging acceleration forces are then corresponding reduced; and consequently the danger of injury is reduced, particularly from whiplash.

In one preferred embodiment of the vehicle seat according to the present invention, the top backrest part has an actuation plate for triggering the adjustment movement. In the case of a crash, the actuation plate is actuated by the back of the person in the seat, introducing the pivot movement of the top backrest part. A sort of pendulum mechanism occurs from the falling back movement of the person in the seat. The seat parts intercepting the person in the seat are moved in the direction to counter the movement of that person.

In another preferred embodiment of the vehicle seat according to the present invention, the bottom backrest part is mounted on two preferably lengthwise adjustable holding rods. Between the rods, the actuation plate is mounted pivotally relative to the clamping device. The holding rods are lengthwise adjustable for the top backrest part to be adapted to the relevant body dimensions of the person in the seat. This adjustment increases the operational security of the interception device in the form of the top backrest part. Preferably, the top backrest part includes a head support and a shoulder support for the person in the seat. Thus, those body parts (i.e., the head and shoulder area) which undergo especially great acceleration in case of a crash are securely held by means of the pivoting movement of the top backrest part.

In another preferred embodiment of the vehicle seat according to the present invention, the clamping device is provided with an adjustment device. The adjustment device has a random inclination adjustment of the top backrest part within a predeterminable angle range. Because of this adjustment device, the top backrest part of the vehicle seat, especially the part involved with the inclination adjustment of the head support, can be angularly adjusted for individual adaptation to the person in the seat.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
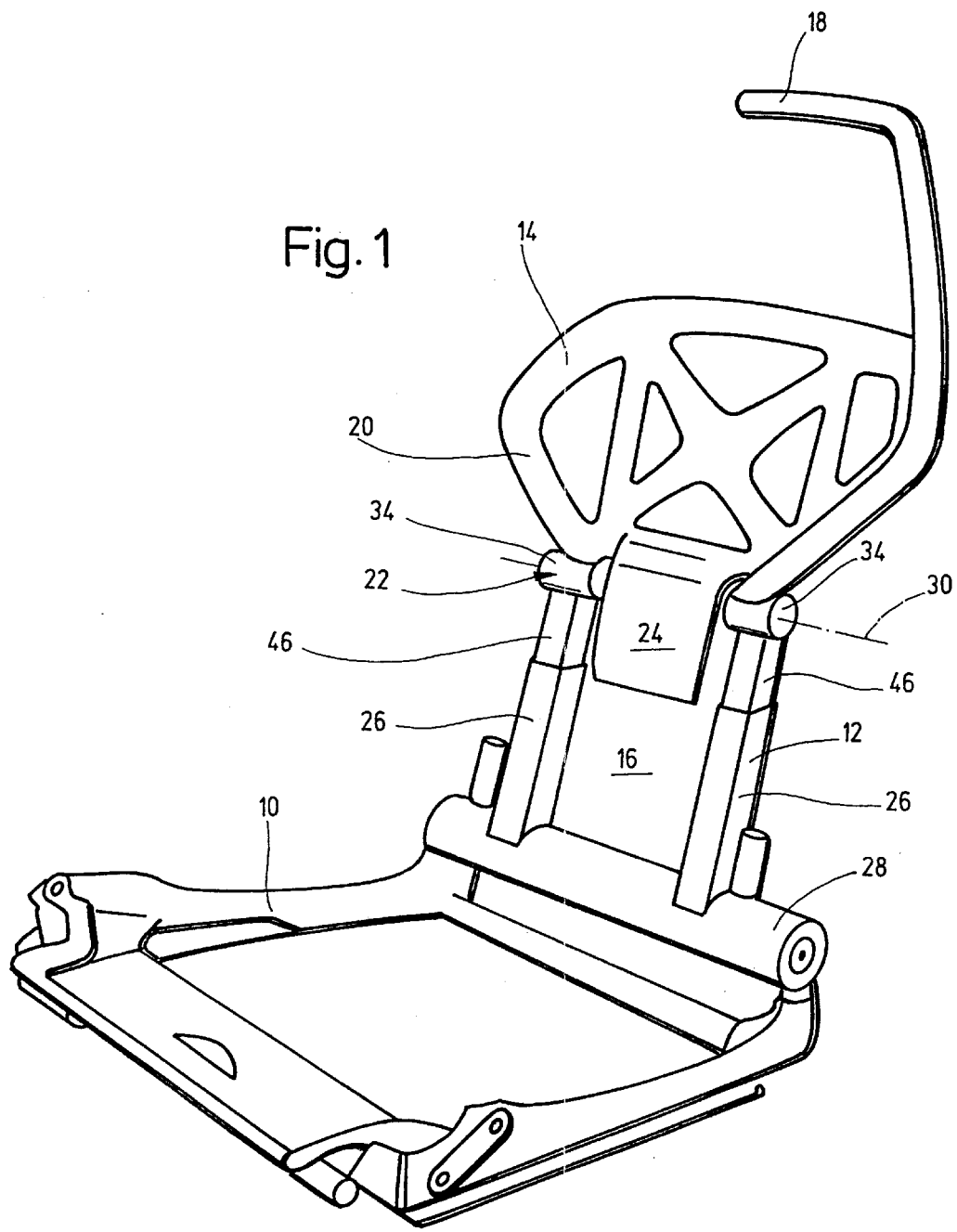
FIG. 1 is perspective view of the interior skeleton of a vehicle seat according to the present invention.

The vehicle seat illustrated in FIG. 1 has a seat part 10 and a backrest 12 adjustable in inclination. The relevant structure of a vehicle seat which is conventional is not described in great detail. For improved illustration, the upholstered parts of the vehicle seat are deleted.

Backrest 12 is divided into two parts, comprising a top backrest part 14 and a bottom backrest part 16. Top backrest part 14 has a connecting hanger member 18 for a head support as well as a half-shell-shaped shoulder support 20, and can pivot relative to bottom backrest part 16 upon overcoming the holding force of a clamping device 22. In case of a crash, under the effect of the actuation force generated by the person in the seat, top backrest part 14 executes an associated adjustment movement, intercepting the person in the seat, as explained in greater detail hereinafter.

The adjustment movement of top backrest part 14 is triggered by actuation plate 24. In a crash, plate 24 is actuated by the back of the person in the seat, and facilitates the pivot movement of top backrest part 14. Actuation plate 24 is constructed flat and smooth at least in the possible contact range with the back of the person in the seat, can pivot between two holder rods 26 which are lengthwise or longitudinally adjustable, and is located in bottom backrest part 16. Both holder rods 26 form support-like reinforcements for backrest 12 together with clamping device 22. A conventional inclination adjustment device 28 is provided between seat part 10 and backrest 12, and is located in the plane of actuation plate 24 such that the actuation plate can receive a force to counter to the holding force of clamping device 22.

Figure 2:
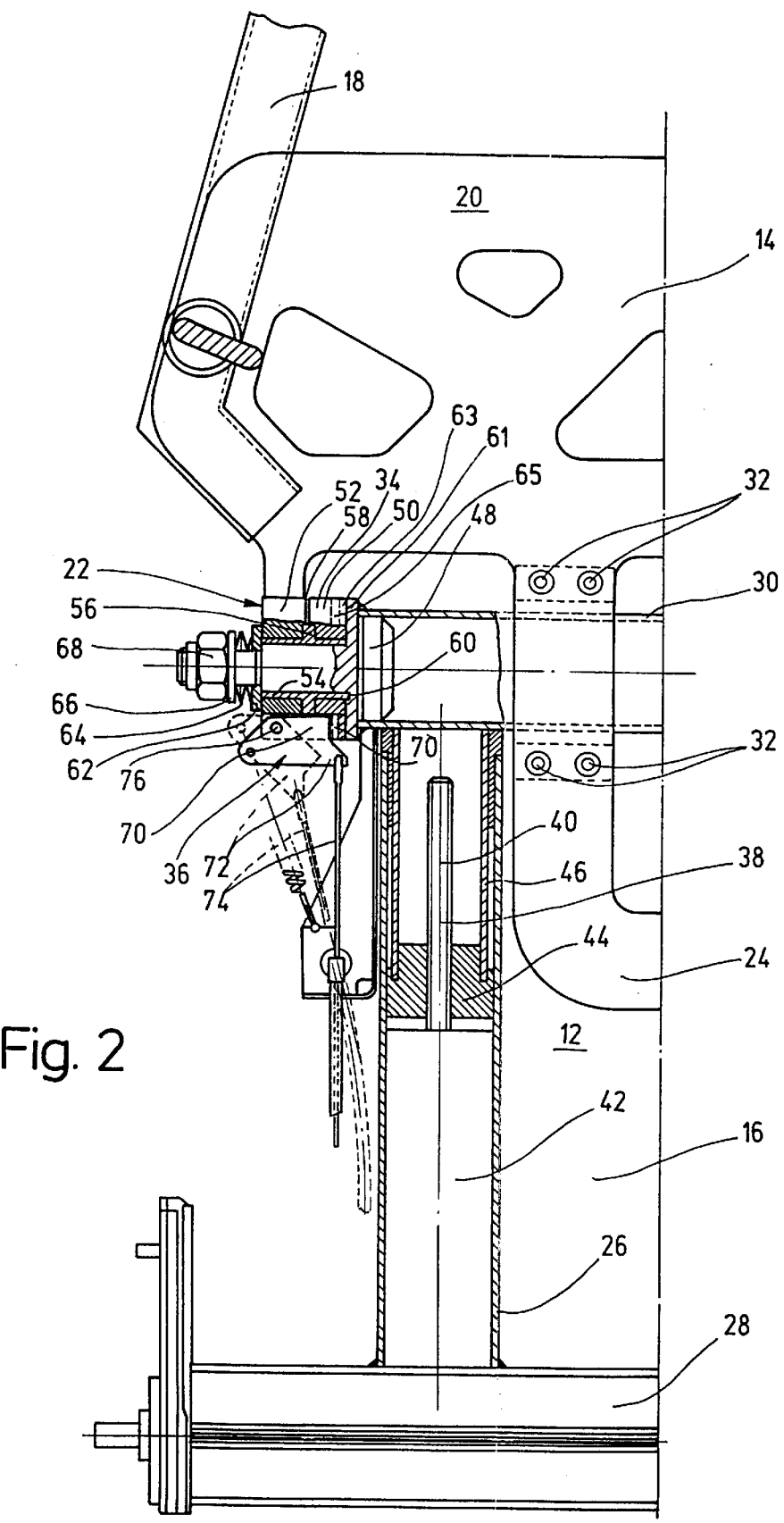
FIG. 2 is a side elevational view in section of the vehicle seat viewed on the left in the illustration of FIG. 1, with a clamping and adjustment device according to a first embodiment of the present invention.

Clamping device 22 is arranged along a horizontal pivot axle 30a. Axle 30a extends along pivot axis 30 and is securely connected with top backrest part 14 through a screw connection 32 (FIG. 2). A slip clutch 34 can be pivoted about pivot axis 30 with clamping device 22 upon overcoming an adjustable holding force for pivoting top backrest part 14. A slip clutch 34 is arranged at each end of pivot axle 30a. A threshold value of actuation force associated with a crash, which actuation force is applied by the person in the seat upon falling back in the seat, is applied to overcome the adjusted holding force of slip clutch 34 to pivot top backrest part 24 forwardly with the head and shoulder support pivoting about axis 30. The forward pivoting of the top backrest part shortens the free path for impact of the top of the body of the person in the seat. The head and should support can be a plurality of parts.

Top backrest part 14, with its head support and its shoulder support 20, is offset relative to actuation plate 24. Actuation plate 24 is arranged below pivot axis 30 and is inclined rearwardly. In this manner, exertion of an impact force on actuation plate 24 causes an associated pendulum movement of head support and shoulder support 20 in an outward direction as viewed in the drawing. For the person in the seat, the unobstructed backward falling path is shortened. The head support need not be more tightly secured and need not be in an integrated arrangement with the cradle-like shoulder support 20 on connection hanger 18. It can be independently adjusted mechanically or electrically relative to shoulder support 20.

An unobstructed inclination adjustment of top backrest part 14 relative bottom backrest part 16, within a predeterminable angular range, correctly fits the relevant seat requirements of the person using the seat. For this adjustment, clamping device 22 is provided with an adjustment device 36 for adjusting the inclination, preferably within a 15 degree range. This adjustment is independent of the triggering mechanism for the slip clutch 34.

The lengthwise height adjustment for top backrest part 14 occurs through adaptation of two lengthwise adjustable holder rods 26. These rods are hollow and have a spindle drive 38. Spindle 40 of spindle drive 38 is controlled through a direct current drive motor 42. On spindle 40, a spindle nut 44 is mounted. The nut is connected with an interior hollow tube 46 arranged longitudinally movable within holder rod 26. Rod 26 is configured as a support tube. On its end opposite spindle nut 44, interior hollow tube 46 is rigidly connected with the horizontally extending pivot axle 30a (FIG. 2).

On its end, hollow pivot axle 30a has a steering pivot pin 48 with a stationary clutch thrust plate 61. Movable disk 50 of slip clutch 34 is mounted on the outward extension of steering pivot part 48. Coaxial to movable disk 50, a rotation ring 52 is also arranged on steering pivot pin 48. Rotation ring 52 is preferably formed as one piece or integral with shoulder support 20 of top backrest part 14 and is fastened rigidly to the end of top backrest part 14.

A radially extending flange is arranged in the middle of a bushing 54 of slip clutch 34, and is engaged between movable disk 50 and rotation ring 52 of each slip clutch 34. A gap 58 remains between disk 50 and rotation ring 52. Bushing 54 radially surrounds a tapering or reduced diameter portion of steering pivot pin 48, and projects axially at one end outward beyond rotation ring 52. The other end of bushing 54 is engaged in an annular groove 60 of the stationary clutch thrust plate 61 of slip clutch 34, retaining a certain axial distance between the bushing end and the bottom of the groove.

Stationary clutch thrust plate 61 has a front tooth arrangement 63 on its side facing movable disk 50 engaging a corresponding tooth arrangement of movable disk 50. The tooth arrangements engage when no crash is occurring.

Upon the event of a crash, front tooth arrangements 63 and 65 ratchet or disengage. Movable disk 50 is moved against the spring bias of bushing 54 to the left as viewed in FIG. 2. Flange 56 of bushing 54 is then moved to the left into an annular gap in rotation ring 52. This movement of bushing 54 allows the thrust movement of movable clutch disk 50.

A disk 62 is engaged on the outer free end of bushing 54. The outer face of disk 62 forms a mounting surface for a disk spring assembly 64 extending between disk 62 and U-shaped disk 66. The biasing arrangement engages steering pivot pin 48, and is maintained under pressure by means of a self-locking nut 68. The prestressing of disk spring assembly 64 by nut 68 through flange 56 of bushing 54 presses movable disk 50 against stationary clutch thrust plate 61 of slip clutch 34. The holding force of slip clutch 34 can be set for the crash circumstance by the compression of disk spring assembly 64 by nut 68. With suitable layout, slip clutch 34 need be provided only on one end of pivot axle 30a. The clutch configured as a slip clutch 34 consequently allows for adjustment of the transmission force by means of nut 68 and disk spring assembly 64, bushing 54, movable clutch disk 50 and stationary clutch thrust plate 61 in case of crash circumstances.

Beneath slip clutch 34, clamping device 22 has adjustment device 36. A random inclination adjustment of top backrest part 14 can be carried out according to the personal requirements of the person in the seat within a predeterminable angular range of preferably 15 degrees by adjustment device 36. Adjustment device 36 is movable relative to indentations 70, with relative angle setting of about 7.5 degrees, on movable disk 50. Movable disk 50 can be locked with rotation ring 52 in these angular settings by means of catch or pawl 72. A Bowden control cable in flexible steel conduit 74 can be controlled manually or electrically, is coupled to catch 72 and causes catch 72 to pivot around a pivot axis 76 between locked and unlocked positions, both represented in FIG. 2.

In operation, the inclination or angle of top backrest part 14 relative to bottom backrest part 16 is varied by operating adjustment device 36. Specifically, catch 72 is pivoted about axis 76 by the cable in conduit 74. When the cable is pulled downwardly, catch 72 is pivoted to remove the catch from one indentation in movable disk 50. When the catch is removed from the indentations in the movable disk, rotation ring 52 can rotate on bushing 54 relative to movable disk 50 to enable angular adjustment of the top backrest part relative to the bottom backrest part. When the cable in conduit 74 is pushed upwardly to return catch 72 to one of the indentations 70, the relative angular orientation of the backrest part is set by the positive, rigid connection of rotation ring 52 and movable disk 50 for normal vehicle operating conditions.

Upon a crash, the seat occupant is pushed rearwardly in the seat against actuation plate 24 to apply torque to top backrest support 14, rotation ring 52, catch 72 and then to movable disk 50, causing the teeth to disengage and the movable disk to move to the left along with bushing 54 against the bias of spring 64. When the teeth disengage, the top backrest support is free to pivot forwardly under the continuing force applied thereto by the seat occupant through actuation plate 24.

Figure 3:
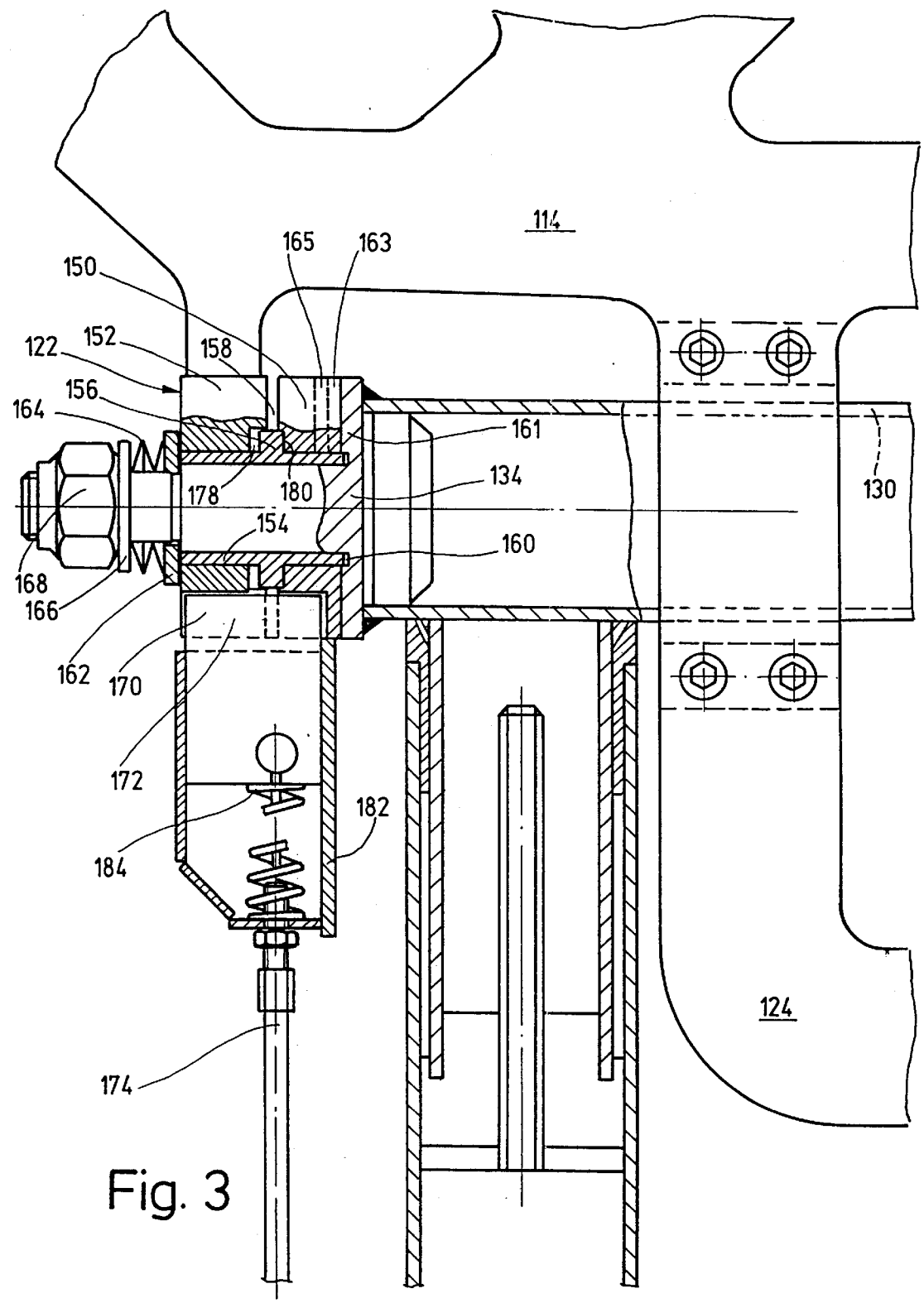
FIG. 3 is a side elevational view in section of a vehicle seat according to a second embodiment of the present invention viewed on the left in the illustration of FIG. 1, with a second or modified embodiment of a clamping and adjustment device.

FIG. 3 illustrates a modified embodiment of a clamping and adjustment device from that of FIG. 2. The corresponding structural parts are identified by similar references as in FIG. 2, but increased by 100 in FIG. 3.

In the enlarged view of FIG. 3, bushing 154 is clearly shown to have some play for axial movement thereof in annular groove 160 relative to stationary clutch thrust plate 161. Also, bushing 154 projects axially outwardly for some distance from rotation ring 152. Flange 156 is guided for axial sliding movement in annular gaps 178 and 180 within rotation ring 152 and movable clutch disk 150 of slip clutch 134, respectively. Disk spring assembly 164 provides its normal actuation adjustment, as shown in FIG. 3. In the illustrated setting, the two tooth arrangements 163 and 165 are in engagement with one another. In the event of a crash, the two tooth arrangements ratchet over or disengage. Additionally, bushing 154 is thrust to the left with movable disk 150, as viewed in FIG. 3, against the force of disk spring assembly 164. This movement of movable disk 150 away from stationary clutch thrust plate 161 allows pivoting movement by top backrest part 114 in response to the pressure on actuation plate 124.

The catch or paw 172 in the second embodiment is configured as a slide or a sliding block which can be engaged in the associated indentation 170 to couple movable disk 150 and rotation ring 152. Catch 172 is longitudinally movable in a longitudinal guide 182 under the control of a Bowden control cable in flexible steel conduit 174. By means of a compression spring 184, the catch 172 is biased towards engagement with indentation 170, but can be moved against the bias of spring 184 to disengage catch 172 from indentation 170, for an individual inclination adjustment. Indentations 170 on rotation ring 152 are rigidly connected with backrest part 114 and can have the 7.5 degree offset for predeterminable inclination adjustment.

The vehicle seat according to the present invention has a multifunction backrest permitting electric backrest adjustment as well as a spinal column distortion adjustment. In addition to an electric height adjustment on the shoulder support and manual or electric inclination adjustment, a secure fixing of the occupant of the seat is provided, especially in the case of a crash from the rear, by the deflecting plate in combination with the adjustable inclination shoulder support. The head support mounting is one-armed, whereby the head support can be pivoted around the top rotary axis. Also, the vehicle seat can be pivoted with adjustable side walls or frames or the like.

While various embodiments have been chosen to illustrate the invention, it will be understood by those skilled in the art that various changes and modifications can be made therein without departing from the scope of the invention as defined in the appended claims.

What is claimed is:

1. A vehicle seat, comprising:
a seat part;
a backrest having a top backrest part and a bottom backrest part, said backrest parts being pivotably connected;
an adjustment means for varying inclination of said backrest relative to said seat part; and
a clamping device, coupled to said backrest parts, providing a clamping force for restraining relative pivoting of said backrest parts during normal vehicle operating conditions and for allowing said top backrest part to pivot relative to said bottom backrest part to intercept a seat occupant in response to an actuating force from the seat occupant overcoming said clamping force and causing pivoting of said top backrest part during crash conditions, said clamping device including a horizontal pivot axle pivotably coupled to said top backrest part by a slip clutch, said slip clutch being adjustable to vary said clamping force and being adjusted to a threshold value for said actuation force associated with crash conditions, said actuation force overcoming said clamping force of said slip clutch and causing forward pivoting of said top backrest part about said pivot axle, said clamping device also including an adjustment device for selectively positioning said top backrest part in a desired angular position relative to said bottom backrest part within a predetermined range.

2. A vehicle seat according to claim 1 wherein
said top backrest part comprises an actuation plate to be engaged by a back of the seat occupant to apply the actuating force during crash conditions.

3. A vehicle seat according to claim 2 wherein
said bottom backrest part comprises first and second holding rods in which first and second hollow tubes are telescopically adjustable; and
said actuation plate is mounted between said holding rods and is pivotable relative to said clamping device.

4. A vehicle seat according to claim 1 wherein
said top backrest part comprises a shoulder support and an adjustable head support.

5. A vehicle seat according to claim 1 wherein
said clamping device comprises a slip clutch having a spring device providing said clamping force; and
said adjustment device comprises at least two angularly spaced indentations and a movable catch selectively receivable in said indentations.

6. A vehicle seat, comprising::
a seat part;
a backrest having a top backrest part and a bottom backrest part, said backrest parts being pivotably connected;
an adjustment means for varying inclination of said backrest relative to said seat part; and
a clamping device, coupled to said backrest parts, providing a clamping force for restraining relative pivoting of said backrest parts during normal vehicle operating conditions and for allowing said top backrest part to pivot relative to said bottom backrest part to intercept a seat occupant in response to an actuating force from the seat occupant overcoming said clamping force and causing pivoting of said top backrest part during crash conditions, said clamping device including an adjustment device for selectively positioning said top backrest part in a desired angular position relative to said bottom backrest part within a predetermined range, and a slip clutch having a spring device providing said clamping force, said adjustment device including at least two angularly spaced indentations and a movable catch selectively receivable in said indentations.

7. A vehicle seat according to claim 6 wherein
said top backrest part comprises an actuation plate to be engaged by a back of the seat occupant to apply the actuating force during crash conditions.

8. A vehicle seat according to claim 7 wherein
said bottom backrest part comprises first and second holding rods in which first and second hollow tubes are telescopically adjustable; and
said actuation plate is mounted between said holding rods and is pivotable relative to said clamping device.

9. A vehicle seat according to claim 6 wherein
said slip clutch pivotably couples a horizontal pivot axle pivotably to said top backrest part, said slip clutch being adjustable to vary said clamping force.

10. A vehicle seat according to claim 9 wherein
said slip clutch is adjusted to a threshold value for said actuation force associated with crash conditions, said actuation force overcoming said clamping force of said slip clutch and causing forward pivoting of said top backrest part about said pivot axle.

11. A vehicle seat according to claim 6 wherein
said top backrest part comprises a shoulder support and an adjustable head support.

\* \* \* \* \*